Figure 1:
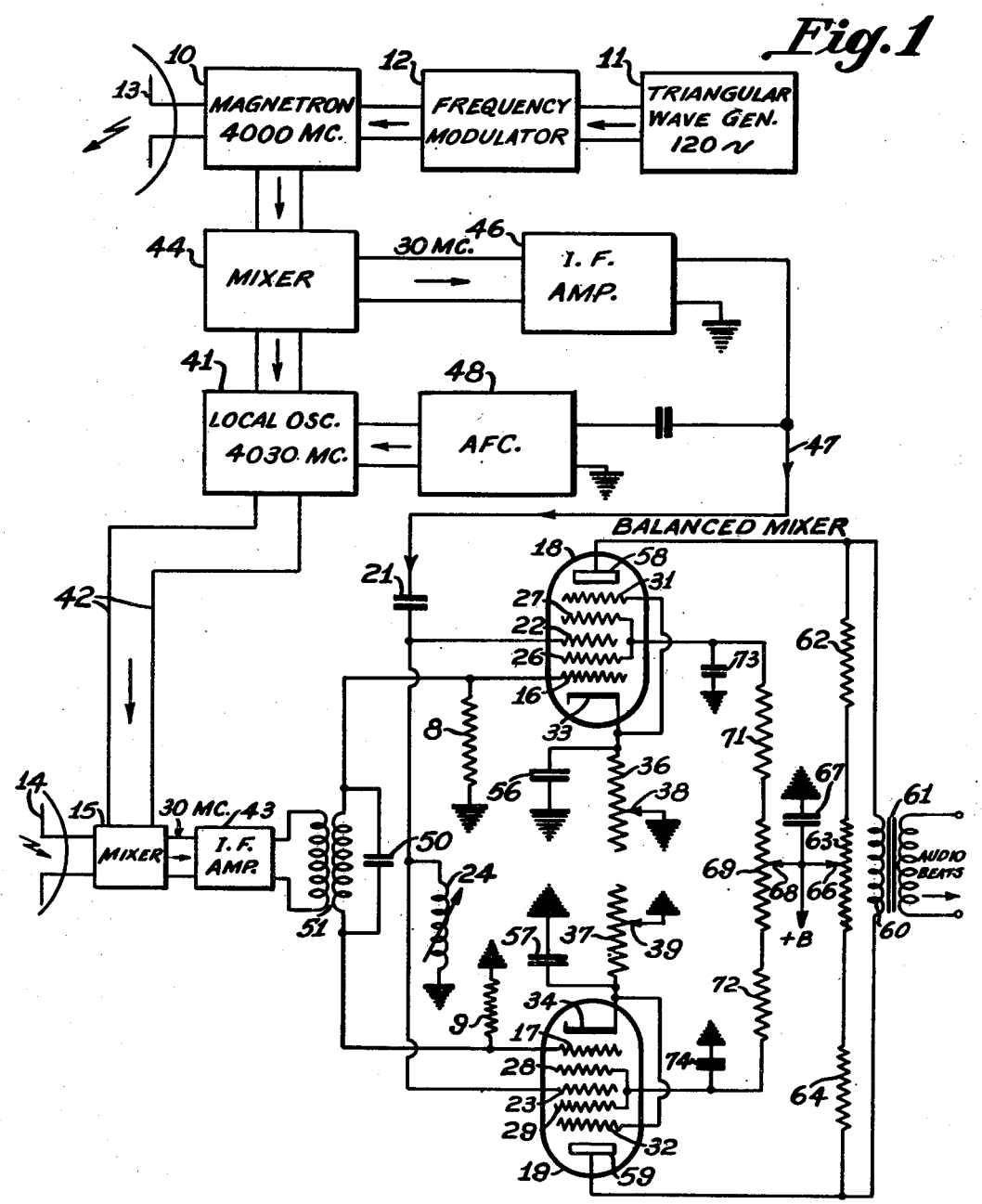

July 5, 1949.  L. CHIA-LIN YUAN  2,475,176
FREQUENCY MODULATED RADAR SYSTEM
OF SUPERHETERODYNE TYPE
Filed Nov. 30, 1946  2 Sheets-Sheet 1

Inventor
LUKE C. YUAN
Attorney

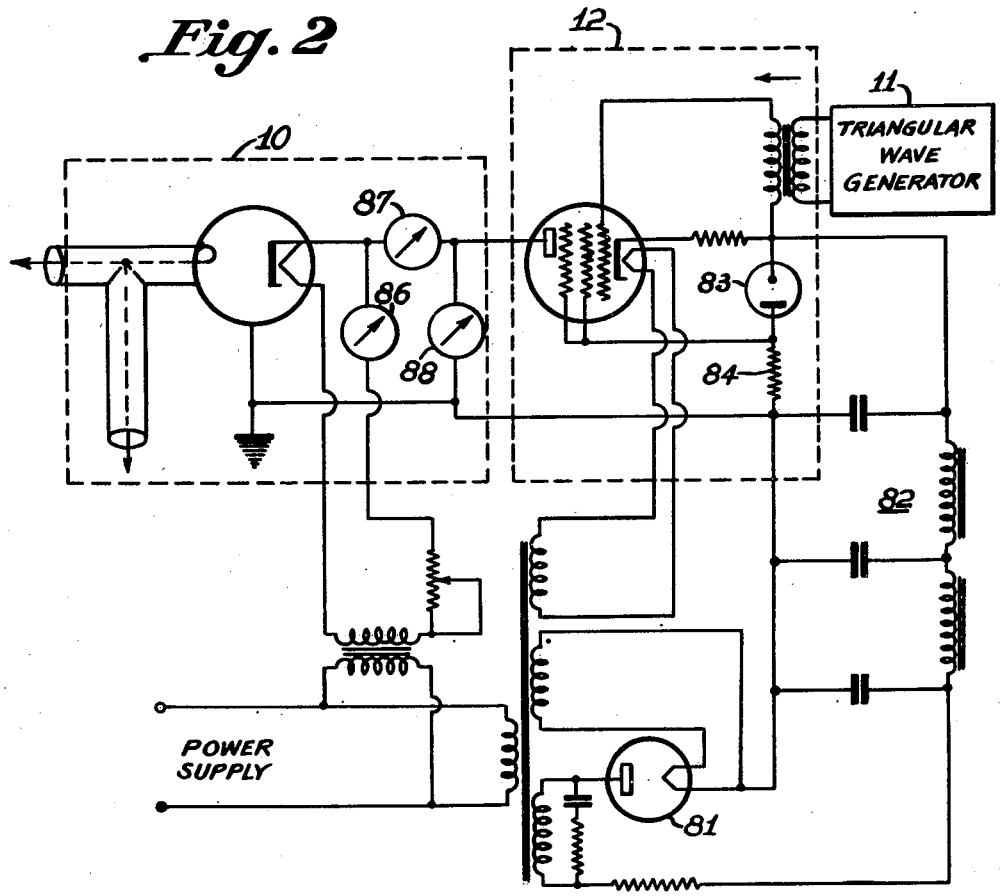

Patented July 5, 1949

2,475,176

UNITED STATES PATENT OFFICE 2,475,176

FREQUENCY MODULATED RADAR SYSTEM OF SUPERHETERODYNE TYPE

Luke Chia-Lin Yuan, Princeton, N. J., assignor to Radio Corporation of America, a corporation of Delaware Application November 30, 1946, Serial No. 713,257

6 Claims. (Cl. 343—14)

My invention relates to radar systems of the frequency modulated type and particularly to FM radar systems of the superheterodyne type operating at high frequencies.

In frequency modulated or FM radar systems there is transmitted a radio wave that is frequency modulated at a periodic rate by a sine wave or by a linear wave such as a sawtooth or trianglar wave. This modulated wave is received after reflection and supplied to a mixer which also has supplied to it frequency modulated signal direct from the transmitter. There appears in the output of the mixer a beat frequency signal or, in the case of the superheterodyne circuit, an i.-f. signal carrying the beat frequency signal. The frequency of the beat frequency signal is a function of the distance to the reflecting object. A system of this type without superheterodyning is described in Bentley Patent 2,011,392. One form of superheterodyne type FM radar system is described in Chaffee Re. 21,955. The form of system that is described in this application and to which the present invention is particularly applicable is described and claimed in application Serial No. 508,031, now Patent No. 2,424,796, issued July 29, 1947, filed October 28, 1943, in the name of Wendell L. Carlson.

In all these systems one of the problems is to avoid errors caused by amplitude modulation that unavoidably is present in some degree for various reasons. It has been a common practice to minimize such errors by balancing out amplitude modulation as much as possible by employing a balanced mixer circuit. Such mixers are described and claimed in application Serial No. 445,010, now Patent No. 2,419,046, issued April 15, 1946, filed May 29, 1942, in the names of Irving Wolff and Royden C. Sanders, Jr., and in application Serial No. 445,720, now Patent No. 2,420,199, issued May 6, 1947, filed June 4, 1942, in the name of Royden C. Sanders, Jr.

In designing superheterodyne type FM radar systems operating at very high frequencies such as 4000 megacycles per second for example, it was found that amplitude modulation was introduced from unexpected sources and was not reduced as much as desired by previously employed balanced mixer circuits. This problem was encountered in the type of circuit described in the above-identified Carlson application, this form of circuit being used because it does not require the use of side-band filters and, therefore, is particularly suitable where a high frequency such as 4000 mc. is used. In this Carlson type of circuit two i.-f. signals are obtained which are supplied to a second detector or mixer where they beat with each other to produce the beat frequency signal that is supplied to a frequency counter.

It was discovered that even when the second detector was of a balanced circuit type such as described in the above-mentioned Wolff et al. or Sanders applications, there was amplitude modulation signal in the second detector output. The source of some of this was traced to the fact that due to noise or the like there was either frequency modulation or amplitude modulation or both on the i.-f. signal derived from the magnetron and local oscillator signals, and that under the most favorable conditions there was an imperfect balance in the balanced detector. Consequently, this i.-f. signal from the magnetron and local oscillator mixer got into the circuit of the i.-f. signal representing the received signal so that the two i.-f. signals would beat in the proper polarity at both detector tubes to pass noise modulation signals through the detector. This was difficult to avoid because this i.-f. signal from said mixer, which is fed to the two detector tubes in parallel relation, is very much stronger than the other i.-f. signal and excites the tuned input transformer. Thus the i.-f. signal from said mixer also appeared on the two detector tubes in out-of-phase or push-pull relation and generally with greater amplitude than the received signal i.-f. signal. Also, the phase relation between the parallel applied phase or frequency modulated signal and the push-pull leakage signal was not constant. Consequently, the two signals beat together producing detected currents corresponding to various noise modulations on the transmitter, whether amplitude or frequency modulations.

An object of the invention is to provide an improved frequency modulated radar system of the superheterodyne type that is particularly adapted for operation at very high radio frequencies.

A further object of the invention is to provide an improved method of and means for reducing the effects of undesired amplitude and/or frequency modulation in a frequency modulated radar system.

A still further object of the invention is to provide an improved balanced detector or mixer circuit in a frequency modulated radar system.

In balanced mixers as previously used in the FM radar systems there are two kinds of balancing, one kind at the input circuit and another kind at the output circuit. At the input circuit, it has been the practice to obtain a balance as to the two applied radio frequency or intermediate frequency signals so that the signal in one r.-f.

or i.-f. circuit does not affect the other r.-f. or i.-f. circuit. At the output circuit, any currents derived from amplitude modulation of the i.-f. input signal from the magnetron-local oscillator mixer is balanced out by a balanced circuit connection.

According to the present invention, at the second detector the undesired action of the strong i.-f. signal on the circuit of the other i.-f. signal at the second detector input is prevented by isolating the two i.-f. signal circuits rather than by employing circuit balancing. This is accomplished in a preferred embodiment of the invention by applying at each detector tube one i.-f. signal to one grid of the tube and applying the other i.-f. signal to another grid which is isolated from the first grid by screening grids. In this way the two i.-f. signal input circuits are isolated from each other so that the problem of balancing at the input circuits is avoided. At the output circuit, any amplitude modulation that may be present is balanced out by a true balancing action as in the earlier circuits.

The invention will be better understood from the following description taken in connection with the accompanying drawing in which Figure 1 is a block and circuit diagram of one embodiment of the invention, and Figure 2 is a circuit diagram of a portion of the circuit shown in block in Fig. 1. In the several figures similar parts are indicated by similar reference characters.

In the drawing there is shown an FM radar system such as an FM altimeter which comprises a radio transmitter oscillator 10 such as a magnetron. The oscillator 10 is cyclically frequency modulated by sawtooth or triangular waves from a generator 11, for example, applied to suitable frequency modulation means 12.

The frequency modulated wave is radiated from an antenna 13, such as a dipole in a parabolic reflector, and after reflection from an object or surface is picked up by a receiving antenna 14.

The received signal is applied to a first detector or mixer 15 which is of any suitable type such as that described and claimed in application Serial No. 625,911, filed October 31, 1945, in the name of Rene A. Braden.

Mixing signal is supplied from a local oscillator 41 to the mixer 15 by way of conductors 42. Since, in the example illustrated, the transmitter frequency is 4000 mc. and the local oscillator frequency is 4030 mc., this results in a 30 mc. i.-f. signal. This i.-f. signal is passed through an i.-f. amplifier 43 and a transformer 51 to the first grids 16 and 17 of the vacuum tubes 18 and 19, respectively, that comprise the second detector or balanced mixer. The transformer 51 is tuned to the intermediate frequency by means of a capacitor 50.

A second i.-f. signal of 30 mc. is obtained by supplying signals from the local oscillator 41 and the transmitter oscillator 10 to a mixer 44. This i.-f. signal is passed through an i.-f. amplifier 46 and over a lead 47 to the third grids 22 and 23 of the tubes 18 and 19, respectively. A coupling capacitor is indicated at 21.

Preferably, an automatic frequency control or AFC circuit 48 is provided as described in the above-identified Carlson application for reducing the frequency band that must be passed by the i.-f. amplifiers. The local oscillator 41 may be a reflex Klystron that is frequency modulated by having the AFC circuit 48 vary the negative bias voltage on the reflector electrode of the Klystron.

It will be seen that the i.-f. signal from the amplifier 43 is applied to the grids 16 and 17 in push-pull relation by way of the transformer 51. Grid leak resistors 8 and 9 are provided between the grids 16 and 17, respectively, and ground. It will also be seen that the i.-f. signal from the amplifier 46 is applied over the lead 47 in parallel relation to the grids 22 and 23 of the tubes 18 and 19, respectively. A variable inductance coil 24, by means of which the grid circuit may be tuned, is connected between the grids 22, 23 and ground.

The grid 22 of tube 18 is isolated by means of shielding grids 26 and 27 while the grid 23 of tube 19 is isolated by means of shielding grids 28 and 29. The tubes 18 and 19 include suppressor grids 31 and 32, respectively.

The cathodes 33 and 34 of the tubes 18 and 19, respectively, are connected through biasing resistors 36 and 37 to ground. The ground points on resistors 36 and 37 may be adjusted by variable taps 38 and 39, respectively, for adjusting the tube biases to make the tubes act individually as linear amplifiers. Cathode resistor by-pass capacitors 56 and 57 are provided.

The anodes 58 and 59 of the tubes 18 and 19, respectively, are connected to opposite ends of the primary 60 of an output transformer 61. The mid-point of the primary 60 is effectively grounded by means of resistors 62, 63 and 64 which are connected across the primary 60 and grounded at their mid-point through a variable tap 66 and a by-pass capacitor 67. Anode voltage is also applied from a +B source, not shown, through the tap 66 and the resistors 62, 63 and 64 to the anodes 58 and 59. Screen grid voltage is applied to the several screen grids by way of a variable tap 68 and resistors 69, 71 and 72. Screen grid by-pass capacitors are shown at 73 and 74.

It will be evident that by adjusting the anode circuit tap 66 and the screen grid circuit tap 68, and by adjusting the cathode bias taps 38 and 39, it is possible to obtain a good balance in the detector output circuit. At the input circuit there is no balancing problem since circuit isolation rather than circuit balancing is employed.

It will be understood that the i.-f. signal passed by the amplifier 43 varies cyclically in frequency due to the frequency modulation on the radiated wave, 30 mc. being the mean frequency in the example given. The upper and lower frequency limits may be 31 mc. and 29 mc. for instance. There is, of course, the same 2 mc. frequency sweep on the 30 mc. i.-f. carrier passed through the i.-f. amplifier 46. The instantaneous frequency difference between the two i.-f. signals, which is a function of the propagation time required for the radio wave to travel to the reflecting object and back, is the desired audio frequency beat signal that is amplified and supplied to a frequency counter, not shown.

Where circuit balancing is employed at the input circuit of the mixer it is possible at best to obtain an exact balance at only one frequency. Because of the frequency deviation or sweep on the carrier there cannot be exact balance throughout the frequency sweep range. This difficulty is avoided by the present invention. The main reason that even slight input unbalance or cross-feed cannot be tolerated at the second detector in the present circuit is because there is unavoidable frequency modulation on the magnetron output due to voltage variation or "noise" effects, and because this undesired frequency modulation will produce an undesired audio frequency current in the mixer output if there is such cross-feed. By eliminating any possibility of such cross-feed, the system operation is greatly improved.

Fig. 2 shows, merely by way of example, one suitable circuit for cyclically frequency modulating the transmitter magnetron 10. The magnetron is frequency modulated by varying its anode current as a function of the triangular wave supplied from generator 11. The anode current variation is obtained by employing a pentode as the modulator tube 12. Since the anode-cathode impedance of the pentode is high compared with the impedance of the magnetron, the desired current control and resulting frequency modulation can be obtained by varying the pentode impedance. This is done by applying the modulating wave to the control grid of the pentode.

The high voltage supply for the magnetron includes the usual rectifier 81 and filter 82. A glow lamp 83 and resistor 84 are connected in series across the filter output terminals and the second and third grids of the pentode are connected to the constant voltage point thus provided at the junction of the glow lamp and resistor. Meters are indicated at 86, 87 and 88.

I claim as my invention:

1. In a radio distance measuring system, means for transmitting a radio wave that is cyclically frequency modulated, means including a first detector for receiving said wave after reflection from a reflecting surface, a local oscillator operating at a frequency that differs from the mean frequency of said transmitted wave by a desired intermediate frequency, means for supplying local oscillator signal to said first detector where it beats with said received wave to produce a first intermediate frequency signal, a mixer, means for supplying both local oscillator signal and direct signal from the transmitting means to said mixer to produce a second intermediate frequency signal, a second detector comprising two vacuum tubes having their output circuits connected in balanced relation, each of said tubes having means for producing an electron stream and each having a first control electrode and having a second control electrode which is isolated from the other tube electrodes, said first and second control electrodes controlling said electron stream, means for applying said first intermediate frequency signal to said first control electrodes in push-pull relation, and means for applying said second intermediate frequency signal to said second control electrodes in parallel relation.

2. In a radio distance measuring system, means for transmitting a radio wave that is cyclically frequency modulated, means including a first detector for receiving said wave after reflection from a reflecting surface, a local oscillator operating at a frequency that differs from the mean frequency of said transmitted wave by a desired intermediate frequency, means for supplying local oscillator signal to said first detector where it beats with said received wave to produce a first intermediate frequency signal, a mixer, means for supplying both local oscillator signal and direct signal from the transmitting means to said mixer to produce a second intermediate frequency signal, a second detector comprising two multi-grid vacuum tubes having their output circuits connected in balanced relation, each of said tubes having a first control grid and having a second control grid which is screened from the other tube electrodes, means for applying said first intermediate frequency signal to said first control grids in push-pull relation, and means for applying said second intermediate frequency signal to said second control grids in parallel relation.

3. The invention according to claim 1 wherein automatic frequency control means is provided for varying the frequency of said local oscillator in synchronism with said cyclic frequency modulation whereby the frequency band width of the intermediate frequency signals is reduced.

4. The invention according to claim 1 wherein there is a tuned circuit to which said first control electrodes are connected and wherein said first intermediate frequency signal is applied to said first control electrodes through said tuned circuit, said tuned circuit being resonant at said intermediate frequency.

5. The invention according to claim 1 wherein said transmitting means comprises a magnetron that is subject to undesired noise modulation.

6. The invention according to claim 1 wherein said vacuum tubes are individually adjustable to make them act individually as linear amplifiers.

LUKE CHIA-LIN YUAN.

REFERENCES CITED

The following references are of record in the file of this patent:

UNITED STATES PATENTS

| Number | Name | Date |
| --- | --- | --- |
| 2,268,587 | Guanella | Jan. 6, 1942 |
| 2,421,394 | Schelleng | June 3, 1947 |